June 30, 1936.  P. PIERRAT ET AL  2,045,722

MANUFACTURE OF THREAD

Filed April 19, 1933

Paul Pierrat  INVENTORS
Rene Picard
BY
*John Lawrence Seymour*
ATTORNEY.

Patented June 30, 1936

2,045,722

UNITED STATES PATENT OFFICE 2,045,722

MANUFACTURE OF THREAD

Paul Pierrat and René Picard, Paris, France, assignors to Du Pont Rayon Company, New York, N. Y., a corporation of Delaware Application April 19, 1933, Serial No. 666,826
In France August 26, 1932

2 Claims. (Cl. 18—8)

This invention relates to a means for filtering and extruding a cellulosic solution, such as viscose, cuprammonium cellulose solution, cellulose acetate spinning solution, or the like, into a coagulating bath for the manufacture of artificial thread. This invention will be described in its application to the manufacture of rayon by the viscose process, but this specific description is used for facility only and does not limit the invention.

In the manufacture of rayon by the viscose process a viscose solution is carried through a pipe line to a spinneret through which it is extruded into a setting bath. Before passing through the spinneret the viscose solution is filtered in order to prevent unxanthated fiber, gel viscose, or traces of foreign matter from reaching and clogging the fine openings in the spinneret. Heretofore the filter has, so far as we know, consisted of a fine cloth having a filtering surface no larger in area than the area of the cross section of the interior of the pipe stretched across the joint between the spinning head, which holds the spinneret, and the end of the pipe. The filtering area heretofore has been no greater than the base of the spinneret, thereby frequently preventing efficient filtration of the solution, when the pressure drop across the filter becomes too great. Furthermore, the relatively large space between the filter and the spinneret base permits stagnation of the viscose, allowing portions thereof to accumulate and gel and subsequently stop up these spinneret orifices.

It is an object of this invention to improve the filtering of fluids in pipe lines. Another object is to improve the manufacture of artificial thread by improving the filtering of the cellulose solution. Other objects of the invention will be in part apparent and in part set forth elsewhere herein.

The objects of the invention are accomplished, generally speaking, by the use of a spinneret filter having a larger filtering surface than has been possible with prior art constructions. More specifically the objects of the invention are accomplished by using a filter having a larger area than the area of the cross section of the interior of the pipe line or fluid supply system. Still more particularly the objects of the invention are accomplished by the means, method, and details of construction herein described.

Figure 2:
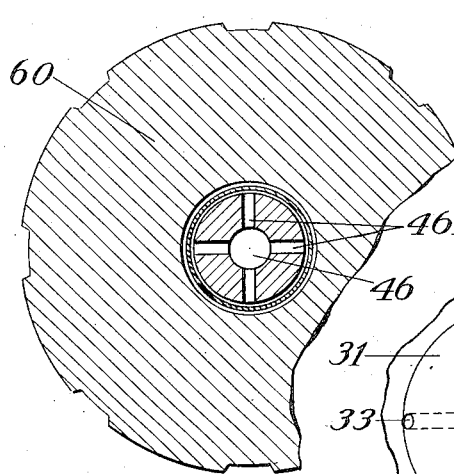
Figure 3:
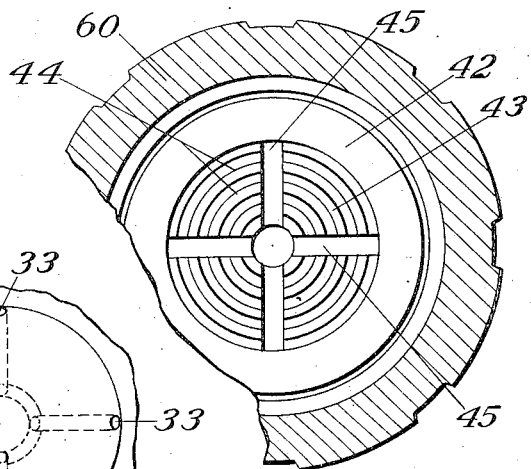
Figure 1:
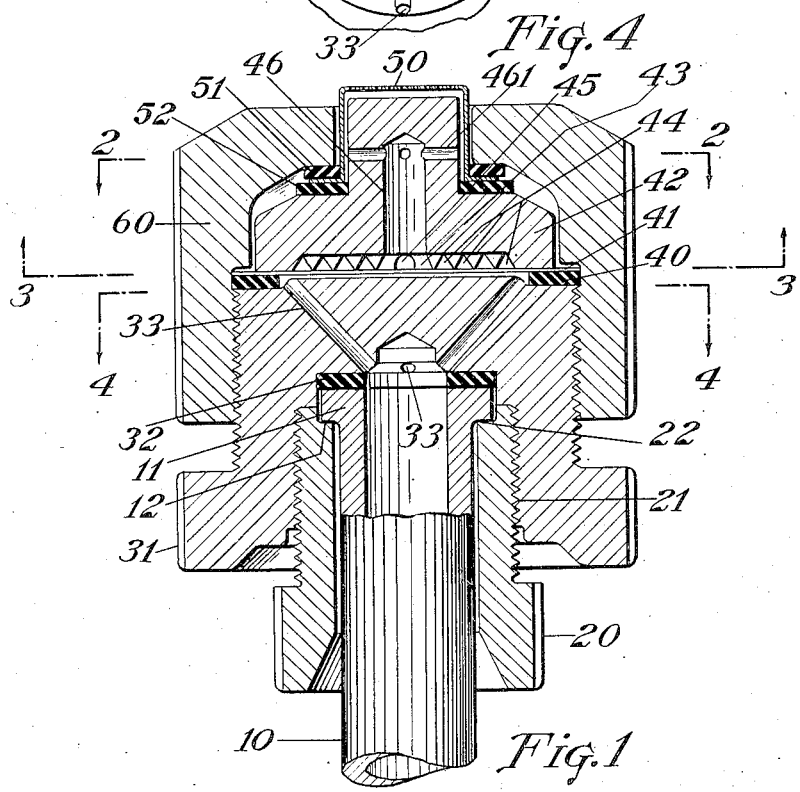

In the drawing, Figure 1 is a cross section through the spinning head of a rayon manufacturing machine. Figure 2 is a section on the line 2—2 of Figure 1. Figure 3 is a section on the line 3—3 of Figure 1. Figure 4 is a section on the line 4—4 of Figure 1.

In the figures of the drawing 10 is a pipe for the transportation of a fluid. In the manufacture of rayon by the viscose process the fluid will be viscose; 11 is an enlargement at the end of the pipe having a shoulder 12; 20 is a sleeve around the pipe; 21 are screw threads on the sleeve; 22 is a rabbet in the end of the sleeve conforming in size and shape to the shoulder 12; 31 is a cap mounted upon the end of the pipe by screw threaded engagement with sleeve 20; 32 is a washer between the cap and the pipe which prevents the escape of the fluid from the system; 33 are holes leading from the section of the cap adjacent the pipe through the top of the cap providing paths through which the fluid in the pipe can pass through the cap; 40 is a washer, preferably of rubber; 41 is a filter, as of cloth, mounted on the washer; 42 is a head mounted on the cap through the washer serving to hold the filter in place and to prevent the escape of fluid above the washer; 43 is a recess in the head; 44 are circular channels forming the recess the ridges between which serve to support the filter; 46 is a hole leading from the base toward the top of the head; 45 are channels connecting the circular channels with hole 46; 461 are holes in the head permitting fluid therewithin to escape from hole 46 into the spinneret; 50 is the spinneret the face of which contains a large number of very fine openings or orifices through which the spinning fluid is extruded; 51—52 are washers preventing the escape of fluid from the spinneret; 60 is a nut having screw threaded engagement with cap 31 holding the cap, head, and spinneret in assembled relation.

The invention functions as follows: Fluid, for instance viscose, will be forced, by pumps not shown, through the pipe and through the holes in the cap into the recess between the cap and the head. The head will be so arranged with relation to the holes 33 of the cap that the fluid coming from the said holes will tend to pass through the filter into the centers of the sections of the circular channels. In actual practice the entire space on the cap side of the filter will be filled with the fluid which will pass through it with practical uniformity into the channels of the head by which it will be transported to the hole leading to the spinneret. It will then be extruded through the openings in the spinneret into the, in the case of viscose, regenerating bath.

Many changes can be made in the invention without departing from its spirit. The circular and cross channels are not essential to the functioning of the device but are advantageous in that the ridges between the circular channels serve to support the filter and prevent it from sagging under the pressure of the fluid. Other changes will be obvious to persons skilled in the art.

An advantage of the invention is in providing a large filtering surface for the filtering of liquid entering a spinning head. Because of the greater area of filter surface, filters of our invention stay in service longer and reduce the time of inaction of the machine and the cost of the process. This reduction in operating cost, when considered in connection with a rayon manufacturing plant having thousands of spinnerets, is considerable. Another advantage of the invention is that the construction of the apparatus permits quick and easy assemblage, dismantling, and substitution of filters. Other advantages of the construction of the spinning head are that the spinning head has no large void in which spinning solution may stagnate, gel, and interrupt operation; the fluid is forced to follow a direct course; is always in motion; keeps the channels of the head clear; and all portions of the fluid are extruded from the spinneret in approximately the order in which they enter the spinning head. Other advantages of the invention will be apparent.

As many apparently widely different embodiments of this invention may be made without departing from the spirit and scope thereof, it is to be understood that we do not limit ourselves to the specific embodiments thereof except as defined in the appended claims.

We claim:

1. A spinning jet comprising a pipe capable of transporting viscose, a cap enclosing the end of the said pipe, a head mounted thereon forming with the cap an enclosed space, a filter held between head and cap and dividing the enclosed space, a projection on the head, a spinneret conforming to the shape of the said projection and spaced somewhat therefrom, means to hold the said parts assembled, diverging holes in the cap connecting the said pipe with the said enclosed space, circular lands in the head in position to support the filter, said head being penetrated by a hole leading axially from the said enclosed space, and holes serving to connect the said axial hole with the space between the said spinneret and the said projection, the relation and arrangement of parts being such that the spinning jet has no large voids wherein viscose may stagnate.

2. In a spinning jet means for transporting a viscose solution, a filter and a spinneret operatively connected to one another in sequence, means between the transporting means and the filter to subdivide and remix the stream of viscose, and means between the filter and the spinneret to subdivide and remix the stream of viscose.

PAUL PIERRAT.
RENÉ PICARD.